United States Patent [19]

Lampe

[11] Patent Number: 5,174,109
[45] Date of Patent: Dec. 29, 1992

[54] CLUTCH TO DISCONNECT LOADS DURING TURBINE START-UP

[75] Inventor: Steven W. Lampe, San Diego, Calif.
[73] Assignee: Sundstrand Corporation, Rockford, Ill.
[21] Appl. No.: 602,637
[22] Filed: Oct. 25, 1990
[51] Int. Cl.⁵ ............................................. F02C 7/268
[52] U.S. Cl. .................................. 60/39.142; 60/39.33
[58] Field of Search ............. 60/39.141, 39.142, 39.15, 60/39.33, 39.091

[56] References Cited

U.S. PATENT DOCUMENTS

| | | | |
|---|---|---|---|
| 3,290,963 | 12/1966 | Oldfield et al. | 60/39.142 |
| 3,416,309 | 12/1968 | Elmes et al. | 60/39.142 |
| 3,834,161 | 9/1974 | Quigley, Jr. et al. | |
| 3,965,673 | 6/1976 | Friedrich | |
| 4,077,202 | 3/1978 | Schutze | |
| 4,542,722 | 9/1985 | Reynolds | 60/39.142 |
| 4,713,982 | 12/1987 | Fluegel et al. | 60/39.142 |
| 4,799,354 | 1/1989 | Midgley | |
| 4,864,812 | 9/1989 | Rodgers et al. | |

OTHER PUBLICATIONS

Treager I. E. *Aircraft Gas Turbine Engine Technology* McGraw Hill, New York 1971. p. 268.

*Primary Examiner*—Louis J. Casaregola
*Attorney, Agent, or Firm*—Antonelli, Terry, Stout & Kraus

[57] ABSTRACT

An aircraft auxiliary power system using a turbine to provide rotational power to a gearbox having coupled to it electric generators and pumps. Between the gearbox and turbine a clutch is provided. The clutch is disengaged when the turbine is started, thus reducing drag on the turbine shaft during starting, and the clutch is engaged after the turbine is started to provide rotational power to the coupled electric generators and pumps.

26 Claims, 1 Drawing Sheet

CLUTCH TO DISCONNECT LOADS DURING TURBINE START-UP

TECHNICAL FIELD

The present invention generally relates to facilitating starting of turbines by disconnecting mechanical loads during turbine start-up by using clutches, and more particularly to facilitating starting of aircraft auxiliary power units (APU) by having clutches disconnect gearboxes that drive pumps and generators not required for APU turbine start-up.

BACKGROUND ART

When the engines of an aircraft are not in use electrical power, hydraulic power and bleed air power are provided by on board APUs. These APUs include turbines which directly provide bleed air and indirectly provide electrical and hydraulic power through conversion of turbine rotary shaft power by use of electrical generators and pumps. Often the conversion of rotary shaft power from APUs includes use of gearboxes to match the rotational speed and torque output of the APUs to the requirements of generators and pumps. Clutches are often used between the APUs and gearboxes.

An example describing use of clutches between aircraft turbines and gears is set out in U.S. Pat. No. 4,799,354 issued to Midgley. Turbines described here are connected to propellers, or fans, through systems of gears with clutches located between portions of the gear systems. The gear systems include two sets of gears, one set of gears directly connected to turbine shafts, and the other sets of gears directly connected to propellers or fans. Clutches are used between the two sets of gears, and it is asserted these clutches disengage the mechanical loads of the propellers, or fans, from the turbines when starting the turbines. As described, only propellers, or fans, are disconnected and no reference is made to APU turbines.

Another example describing use of clutches is set out in U.S. Pat. No. 4,077,202 to Schutze. The described system includes an aircraft engine, an auxiliary gas turbine for producing rotational power as well as pressurized gas, and an air turbine to provide compressed gas, i.e., pneumatic power, to the auxiliary gas turbine. The shafts of the aircraft engine and the auxiliary gas turbine are connected by clutches to a gearbox. These clutches are preferably override clutches. Connected, without clutches, to the gearbox are auxiliary equipment such as pumps and electric generators. As connected to the gearbox by override clutches the aircraft engine and auxiliary gas turbine can turn the shafts of the pumps and electric generators, but the shafts of the aircraft engine and auxiliary gas turbine cannot be turned by the gears in the gearbox because the override clutches only permit one way drive. With respect to the air turbine, a override clutch connects the aircraft engine to the air turbine shaft so the aircraft engine can be driven by the air turbine shaft but not vice versa.

The U.S. Pat. No. 4,864,812 issued to Rogers et al. describes still another example of clutches used with turbines on aircraft. Here, use of both APUs and emergency power units (EPUs) on a single aircraft is addressed. The APU provides electrical and hydraulic power and bleed air when aircraft engines are not in use, and the EPU is capable of quickly responding to unexpected aircraft power failures even at high altitudes to provide sufficient electrical and hydraulic power so a pilot can regain aircraft control. The system described includes a mechanical gearbox connected to an electrical generator, hydraulic pump and other accessory equipment to be driven by either the APU or EPU. A clutch is connected between the gearbox and APU, and a second clutch is connected between the gearbox and EPU. In normal operation, the clutch between the APU and gearbox is engaged and the clutch between the EPU and gearbox is disengaged. If there is a system failure requiring emergency power the clutch between the APU and gearbox is disengaged and the clutch between the EPU and gearbox is engaged.

Ignored by the above described systems is reduction of mechanical loads applied to APU output shafts during APU turbine start-up. Starting of APUs on aircraft to drive pumps and electric generators is not facilitated by use of clutches to: (1) disengage propellers, or fans, during starting of aircraft main engines; (2) selectively connect aircraft engines or auxiliary gas turbines to gearboxes used to drive pumps and electric generators; or (3) selectively connect APUs or EPUs to gearboxes used to drive pumps and electric generators. Without reductions in mechanical loads applied to APU output shafts, the on board systems used to start APUs must be sized in both volume and weight to start APU turbines and concurrently drive mechanical loads through gearboxes.

DISCLOSURE OF THE INVENTION

It is an object of the present invention to reduce mechanical loads driven by output shafts of APUs during start-up of APUs.

Another object of the present invention is to provide lower volume and lighter weight combined systems for generation of electrical and hydraulic power on board aircraft including the equipment for starting APUs.

Still another object of the present invention is to provide an APU starter system that reliably starts the APU.

These and other objects are attained in the preferred embodiment of the present invention by having those auxiliary equipment components such as electric generators and pumps not required for APU start-up disengaged from the output shaft of the APU by a clutch. In particular, those auxiliary equipment components which must provide outputs during APU startup, such as fuel control, are connected to the APU output shaft through a gearbox. However, those auxiliary equipment components, such as electric generators and hydraulic pumps, not required for APU start-up are connected to the output shaft of the APU through a clutch and gearbox. So during APU start-up the mechanical load contributed by auxiliary equipment on the APU output shaft is eradicated by disengaging a clutch. With this reduction in mechanical load the APU can be reliably started using reduced volume and weight starter equipment. When the APU is started, the clutch can be engaged to provide APU rotation power to the auxiliary equipment components not required for APU start-up.

BRIEF DESCRIPTION OF THE DRAWINGS

The various objects, advantages and novel features of the present invention will become more readily apprehended from the following detailed description when taken in conjunction with the appended drawing, in which.

BEST MODE FOR CARRYING OUT THE INVENTION

Figure 1:
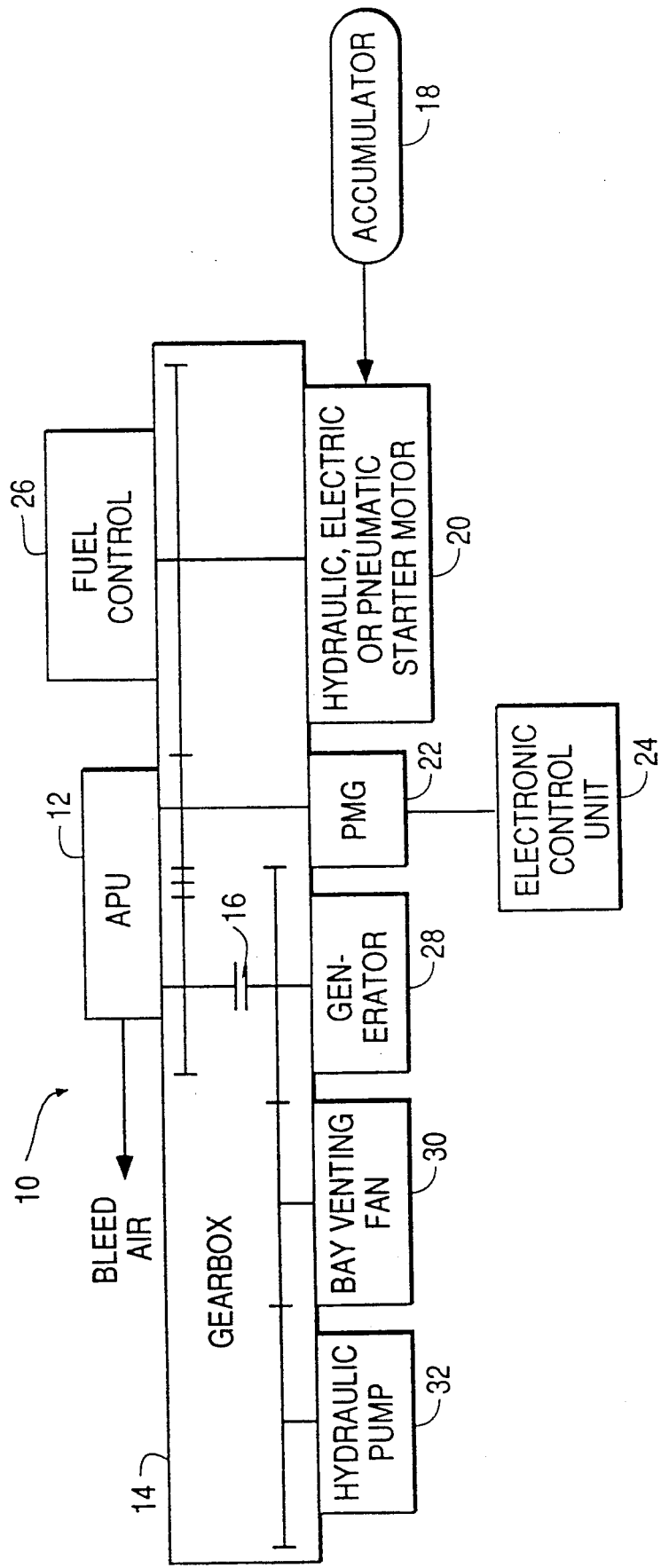
FIG. 1 is a schematic diagram showing an APU with associated start-up equipment, a gearbox connected to the APU and auxiliary equipment required for APU start-up, and a clutch in the gearbox between the APU output shaft and auxiliary equipment components in accordance with the present invention.

Referring now to the drawing, an auxiliary power system 10 with an APU 12, start-up equipment, gearbox 14, clutch 16 and auxiliary equipment components according to the present invention is shown in FIG. 1.

This arrangement provides an accumulator 18 with hydraulic starter motor 20, a permanent magnet generator (PMG) 22 with electronic control unit 24, and a fuel control 26 all connected to the APU 12 through the gearbox 14 for starting the APU 12. The preferred embodiment shows a hydraulic start system, but electric or pneumatic starting systems are also applicable.

After the APU 12 is started, bleed air directly from the APU 12 can be provided to aircraft systems as needed. Also the clutch 16, in the gearbox 14, which has been disengaged during APU 12 start-up to reduce mechanical loads driven by start-up equipment, can be engaged. So engaged, the clutch 16 transmits rotational power from the APU 12 through the gearbox 14 to generator 28, bay venting fan 30, hydraulic pump 32 and other auxiliary equipment not required for APU 12 start-up.

Typically, the clutch 16 should be a slip clutch type to provide smooth acceleration and reduced impact loading of gearbox 14 components. The clutch 16 can also be of the command engagable type.

For an exemplary auxiliary power system 10 as shown in FIG. 1, the APU 12 principle start-up equipment exclusive of the accumulator 18, i.e., the hydraulic starter motor 20, permanent magnet generator (PMG) 22, electronic control unit 24, and fuel control 26 including shut-off valves have the same weight and volume as a system without a clutch 16 to disengage auxiliary equipment not needed for APU 12 start-up. With a clutch 16, the accumulator 18 for the hydraulic start-up system can be reduced in weight by 52% and rated load driving capability with the weight reduction being from 140 pounds to 67.2 pounds. This substantial halving in weight accordingly reduces required volume, and still provides reliable starting of APU 12. The 72.8 pound reduction in required accumulator 18 weight is in part offset by added weight of clutch 16 (5.47 pounds), clutch controls (4.85 pounds) and required additional gearbox weight (5 pounds). Thus, for the exemplary system shown in FIG. 1, a total weight savings of 57.48 pounds is provided.

The above discussion and related illustrations of the present invention are directed primarily to preferred embodiments and practices of the invention. However, it is believed that numerous changes and modifications in the actual implementation of the concepts described herein will be apparent to those skilled in the art. It is contemplated that such changes and modifications may be made without departing from the scope of the invention as defined by the following claims which cover electric, hydraulic and pneumatic APU start-up variations of the invention.

I claim:

1. A starting system for an aircraft auxiliary power unit having a turbine used for producing auxiliary power in an aircraft comprising:
   a starter motor system rated only to drive a load of starting equipment used during starting of the turbine and not to drive power producing equipment used only after starting is completed during operation of the auxiliary power unit in producing the auxiliary power;
   a gearbox mechanically connecting the starter motor to the turbine and to the starting equipment used during starting the turbine with power being connected from the starter motor to the starting equipment and to the turbine on a non-interruptible basis during starting of the auxiliary power unit;
   a clutch having an input connected by the gearbox to an output of the turbine and a clutch output which is driven only during engagement of the input with the output of the clutch with the clutch being disengaged during starting of the auxiliary power unit and engaged during operation of the auxiliary power unit in producing auxiliary power; and wherein
   the power producing equipment is driven from the output of the clutch by the gearbox and produces the auxiliary power during operation of the auxiliary power unit and is not driven from the output of the clutch during starting of the auxiliary power unit.

2. A starting system in accordance with claim 1 wherein the starter motor system comprises:
   a hydraulic starter motor with accumulator and the starting equipment comprises a permanent magnet generator with electronic control unit and fuel control for the turbine with the gearbox driving the permanent magnet generator and fuel control on a non-interruptible basis during starting of the auxiliary power unit by the starter motor through the gearbox.

3. A starting system in accordance with claim 1 wherein the power producing equipment comprises:
   a hydraulic pump.

4. A starting system in accordance with claim 1 wherein the power producing equipment comprises:
   an electrical generator.

5. A starting system in accordance with claim 1 wherein the power producing equipment comprises:
   a fan.

6. A starting system in accordance with claim 1 wherein the power producing equipment comprises:
   a fan, hydraulic pump and an electrical generator.

7. A starting system in accordance with claim 1 wherein the power producing equipment comprises:
   a hydraulic pump and an electrical generator.

8. A starting system in accordance with claim 2 wherein the power producing equipment comprises:
   a hydraulic pump.

9. A starting system in accordance with claim 2 wherein the power producing equipment comprises:
   an electrical generator.

10. A starting system in accordance with claim 2 wherein the power producing equipment comprises:
    a fan.

11. A starting system in accordance with claim 2 wherein the power producing equipment comprises:
    a fan, hydraulic pump and an electrical generator.

12. A starting system in accordance with claim 2 wherein the power producing equipment comprises:

a hydraulic pump and an electrical generator.

13. A starting system in accordance with claim 1 wherein:
the clutch is a slip clutch.

14. A starting system in accordance with claim 1 wherein:
the clutch includes means controlling engagement of the clutch in response to a command.

15. A starting system in accordance with claim 1 wherein the starter motor system comprises:
an electric starter motor and the starting equipment comprises a permanent magnet generator with electronic control unit and fuel control for the turbine with the gearbox driving the permanent magnet generator and fuel control on a noninterruptible basis during starting of the auxiliary power unit by the starter motor through the gearbox.

16. A starting system in accordance with claim 15 wherein the power producing equipment comprises:
a hydraulic pump.

17. A starting system in accordance with claim 15 wherein the power producing equipment comprises:
an electrical generator.

18. A starting system in accordance with claim 15 wherein the power producing equipment comprises:
a fan.

19. A starting system in accordance with claim 15 wherein the power producing equipment comprises:
a fan, hydraulic pump and an electrical generator.

20. A starting system in accordance with claim 15 wherein the power producing equipment comprises:
a hydraulic pump and an electrical generator.

21. A starting system in accordance with claim 1 wherein:
the starter motor system comprises:
a pneumatic starter motor and the starting equipment comprises a permanent magnet generator with electronic control unit and fuel control for the turbine with the gearbox driving the permanent magnet generator and fuel control on a non-interruptible basis during starting of the auxiliary power unit by the starter motor through the gearbox.

22. A starting system in accordance with claim 21 wherein the power producing equipment comprises:
a hydraulic pump.

23. A starting system in accordance with claim 21 wherein the power producing equipment comprises:
an electrical generator.

24. A starting system in accordance with claim 21 wherein the power producing equipment comprises:
a fan.

25. A starting system in accordance with claim 21 wherein the power producing equipment comprises:
a fan, hydraulic pump and an electrical generator.

26. A starting system in accordance with claim 21 wherein the power producing equipment comprises:
a hydraulic pump and an electrical generator.

* * * * *